No. 617,767. Patented Jan. 17, 1899.
L. PRIDEAUX.
THILL COUPLING.
(Application filed Feb. 7, 1898.)
(No Model.)
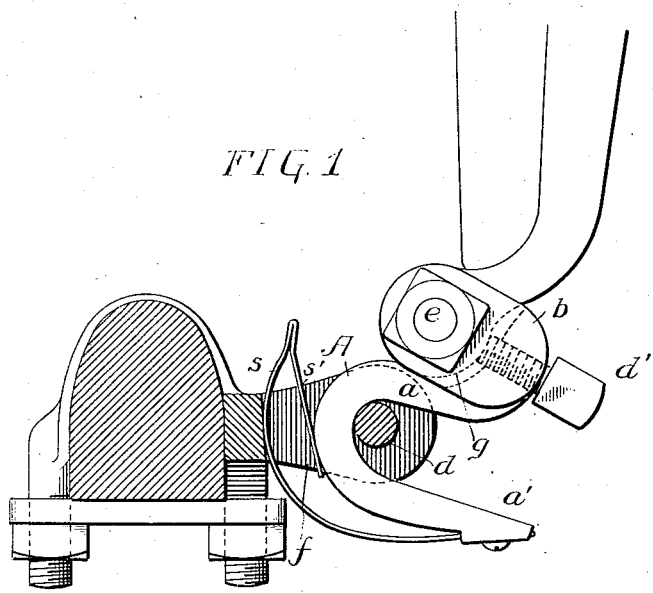
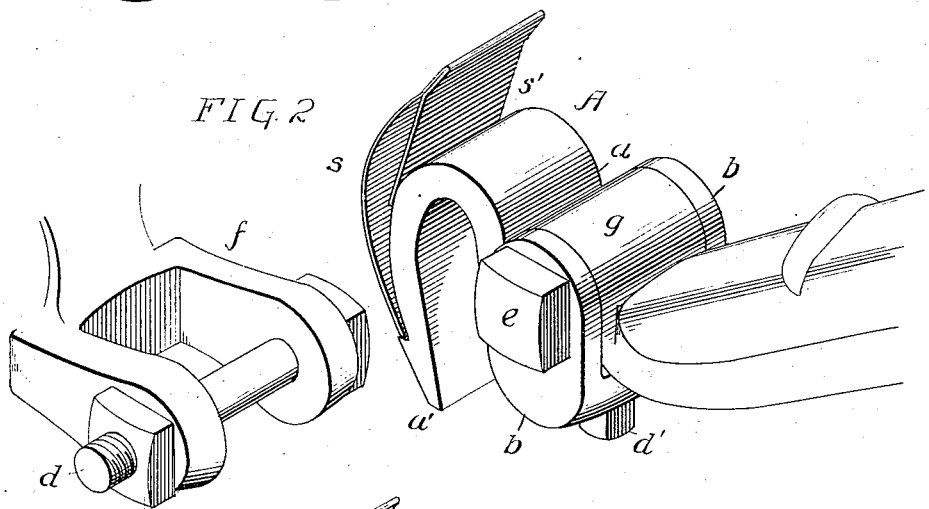
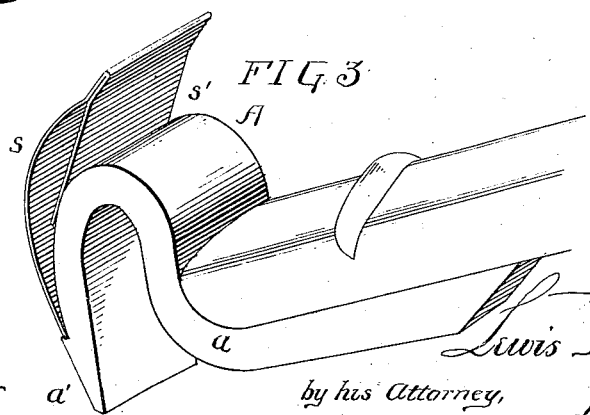
Witnesses:
Inventor:
Lewis Prideaux,
by his Attorney,

UNITED STATES PATENT OFFICE.

LEWIS PRIDEAUX, OF PHILADELPHIA, PENNSYLVANIA.

THILL-COUPLING.

SPECIFICATION forming part of Letters Patent No. 617,767, dated January 17, 1899.

Application filed February 7, 1898. Serial No. 669,354. (No model.)

*To all whom it may concern:*

Be it known that I, LEWIS PRIDEAUX, a citizen of the United States, and a resident of the city of Philadelphia, State of Pennsylvania, have invented certain new and useful Improvements in Thill-Couplings, of which the following is a full, clear, and exact description, reference being had to the accompanying drawings, forming part of this specification.

My invention consists in an improved form of thill-coupling, and has for its object to provide a coupling which may be readily attached to shafts or tongues of vehicles of ordinary construction without changing or altering the same for connection with the clip-bolt provided upon the axle.

A further object is to provide a secure and readily-attached coupling which will prevent rattling and which when the shaft or tongue is in position in use is positively locked against displacement or uncoupling.

In the accompanying drawings, Figure 1 is a perspective view of a thill-coupling constructed in accordance with my invention. Fig. 2 is a detached perspective view of the parts shown in Fig. 1, and Fig. 3 is a perspective view of a modification of my invention.

Referring to the drawings, A is a hook with the downwardly-projecting member $a'$ so formed that when the shaft is in position in use the portion $a'$ prevents the disengagement of the hook from the bolt $d$ of the axle-clip $f$ by any direct upward movement of the shaft and only allows of it becoming disengaged by the dropping of the shafts or removal of the bolt $d$.

As illustrated in Figs. 1 and 2, upon the short shank $a$ of the hook A, I provide a box for the reception of the eye of the thill-iron of the shaft or tongue, comprising ears or lugs $b$, having a bolt $e$ passing transversely through the same in perforations provided for the purpose. The bolt $e$, having a screw-threaded end and nut provided thereon, is passed through the eye $g$ of the thill-iron of the shaft or tongue. I also preferably provide, in order to more securely and rigidly hold the hook upon the eye $g$ of the shaft or tongue, a set-screw $d'$ through the shank $a$, which is designed to impinge upon the outer surface of the eye $g$ when in position or to protrude a short distance into the metal forming the eye in an orifice specially bored or reamed for the purpose. To the hooked portion $a'$ I secure, preferably at the lower end, by small screws, a plate-spring $s$, slightly convex, having the upper end $s'$ bent down and under, so as to impinge upon the outer face of the portion $a'$.

To secure the shafts or tongue in position, the shaft ends are dropped, so as to allow the portion $a'$ of the hook A to pass over the bolt $d$ of the axle-clip $f$. The shafts may then be raised into position for harnessing, and the hook thus automatically becomes locked by reason of the construction, as hereinbefore stated and as illustrated in Fig. 1.

The spring $s$ when in position impinges against the axle bed or portion of the clip $f$ and keeps the inner face of the hook snugly against the bolt $d$, thus preventing rattling and insuring an easy noiseless coupling.

In the modification illustrated the shank $a$ is elongated and secured by bolts or rivets to the shaft end directly without the intervention of the intermediate eye-box hereinbefore described.

Having thus described my invention, what I claim, and desire to secure by Letters Patent, is—

1. In a thill-coupling an adjustable intermediate hook comprising a box rigidly attached to the said hook with upwardly-extending ears and transverse bolt provided therethrough for securing the eye of the end of the shaft or tongue and the upwardly and outwardly extending plate-spring secured to the outer face of the hook at the lower end, the free end of said spring being bent over and impinging between the other member of the spring and the outer face of the hook, substantially as described.

2. In a thill-coupling an adjustable-hook construction comprising a hook, eye-box provided upon the shank of the hook having ears or lugs on opposite sides and transverse bolt provided therethrough for the reception of the eye of the shaft or tongue and set-screw provided in the shank of the hook adapted to impinge upon or protrude into the eye of the shaft or tongue when in position for more rigidly securing the same and convex plate-spring provided on the outer face of said hook for engagement upon the axle-bed when the hook is in position in the axle-clip to prevent rattling or displacement, substantially as described.

3. A thill-coupling comprising hook, A, lugs, b, provided upon the shank, a, of the hook, transverse bolt, e, provided through said lugs for securing the hook upon the eye of the shaft or tongue, and spring, s, provided upon the outer face of the downwardly-projecting member, a', of said hook, substantially as described.

4. A thill-coupling comprising hook, A, lugs, b, provided upon the shank, a, of the hook, transverse bolt, e, provided through said lugs for securing the hook upon the eye of the shaft or tongue, and spring, s, provided upon the outer face of the upwardly-projecting member, a', of said hook, and set-screw d', provided through the shank, a, substantially as described.

5. In a thill-coupling, an adjustable intermediate hook having the portion, a', formed at such an angle as to prevent displacement from the bolt, d, when the shaft is in position in use, said intermediate hook having in the forward part of the same upwardly-extending ears forming an eye-box rigid with the hook carrying a transverse bolt provided therethrough for securing the eye of the end of the shafts or tongue of a vehicle, substantially as described.

In witness whereof I have hereunto set my hand this 2d day of February, A. D. 1898.

LEWIS PRIDEAUX.

Witnesses:
HORACE PETTIT,
FRANK D. GRAHAM.